US007477890B1

(12) United States Patent
Narayanaswami

(10) Patent No.: US 7,477,890 B1
(45) Date of Patent: Jan. 13, 2009

(54) DEMAND PULL—MULTICHANNEL ASYNCHRONOUS DATA AND APPLICATION SYNCHRONIZATION FOR PERVASIVE DEVICES

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 09/608,044

(22) Filed: Jun. 30, 2000

(51) Int. Cl.
    *H04Q 7/20* (2006.01)
(52) U.S. Cl. ............... 455/414.1; 455/414.3; 455/418; 455/419
(58) Field of Classification Search .............. 455/414, 455/412, 41, 66, 3.01, 3.03, 3.04, 3.05, 3.06, 455/410, 418, 419, 420
    See application file for complete search history.

(56) References Cited

U.S. PATENT DOCUMENTS

| 5,131,020 | A | * | 7/1992 | Liebesny et al. | ......... 455/414.3 |
| 5,752,242 | A | | 5/1998 | Havens | |
| 5,768,528 | A | | 6/1998 | Stumm | |
| 5,835,923 | A | * | 11/1998 | Shibata et al. | ............... 715/526 |
| 6,091,530 | A | * | 7/2000 | Duckworth | .................. 359/172 |
| 6,209,026 | B1 | * | 3/2001 | Ran et al. | .................... 709/218 |
| 6,320,946 | B1 | * | 11/2001 | Enzmann et al. | ............ 379/143 |
| 6,400,940 | B1 | * | 6/2002 | Sennett | ........................ 455/414 |

FOREIGN PATENT DOCUMENTS

GB           2 313 981 A        12/1997
WO        WO 98/52106          11/1998

OTHER PUBLICATIONS

"The World's Smallest PDA Computer Watch", Hammacher Schlemmer Mid Summer 2000 Catalog, p. 3.
S. Goose, et al., "Enhancing Web accessibility via the Vox Portal and a Web-hosted dynamic HTMLvVoxML converter", Computer Networks 33 (2000), Published by Elsevier Science B.V., pp. 583-592.

* cited by examiner

*Primary Examiner*—Erika A Gary
(74) *Attorney, Agent, or Firm*—Scully, Scott, Murphy & Presser, P.C.; Vazken Alexanian

(57) ABSTRACT

A system and methodology for enabling a user to asynchronously request a data transfer operation (pull) via a first communication medium, and enable receipt of the requested data over a second communication medium, including a wireless channel for storage/presentation in a wearable mobile computing device/appliance (e.g., a wrist watch device) capable of wirelessly accessing information from a network or communications device.

25 Claims, 6 Drawing Sheets

DEMAND PULL—MULTICHANNEL ASYNCHRONOUS DATA AND APPLICATION SYNCHRONIZATION FOR PERVASIVE DEVICES

BACKGROUND OF THE INVENTION

1. Field of the Invention

This invention relates generally to communication systems generally, and more specifically, to a system that enables the asynchronous request of a data transfer operation (pull) via a first communication medium or channel, and synchronous receipt of the requested data over a wireless communication channel for storage/presentation in a wearable mobile computing device/appliance (e.g., a wrist watch device) capable of wirelessly accessing information from a network or communications device.

2. Discussion of the Prior Art

Computing, mobile and wireless communications technologies have been rapidly advancing-culminating in a variety of powerful user friendly devices such as personal digital assistants (PDAs), cellular phones, pagers, etc. Today, it is possible to purchase handheld PDA's, e.g., palmtops such as the Palm Pilot®, that employ wireless communication devices and that combines computing, telephone/fax, and networking features. A typical PDA may function as a cellular phone, fax sender, and personal organizer and are pen-based, requiring a stylus for text entry. As such, these device incorporate handwriting recognition features and may even employ voice recognition technologies that react to voice input. Small devices such as the RIM 950 and the Motorola PageWriter 2000 pager use a small keyboard for input.

Today, the industry is striving to provide advancements by providing increased PC desktop-like functionality while both decreasing size and power requirements. More recently there have been attempts to incorporate some of the capabilities of the above devices into wrist watches. However, today, only special wearable watch devices are available that, besides time keeping functions, may possess a compass, or a Global Positioning System (GPS), or barometer, heart rate monitor, Personal Handy System (PHS) phone, pager, etc. There are shortcomings in these existing special function watches in that most of them are bulky, are mostly unconnected the Internet or other PC/network devices, have limited battery life, and, are difficult to use. These currently available special function wrist watches additionally have user interfaces that are quite limited in what they can display. For example, in the context of setting time in digital watches, currently, the user is only enabled to set the hour and minute independently, with time only advancing in one direction. Furthermore, most of them have a 6 to 8 seven segment LED or LCDs which can be used to display 6 or 8 digits/letters, and have a small number of indicators that can display AM/PM, Alarm on/off, etc. only at fixed locations within the display. A few watches are currently appearing on the market that have slightly richer display characteristics. Regardless, these various shortcomings have to be solved, otherwise there is no compelling reason for these watches to become popular. The design of a wrist watch for mobile computing applications offers a significant challenge because the watch is a small device. That is, both fitting components and power supplies such as batteries into such a small volume and given the limited screen size of watches pose limitations that have be overcome. Solving these issues is worthy because the watch is an attractive form as 1) it is one of the few devices that a very large fraction of the population is already accustomed to worldwide, 2) is accessible almost all the time, and, 3) is hard to lose.

It would thus be highly desirable to provide a wearable device/appliance (a wrist watch) capable of wirelessly accessing information and equipped with an interactive user interface and high resolution display for providing a variety of desktop PC-like functions.

A common operation pertaining to use of a pervasive device such as a personal digital assistant (PDA) like the Palm Pilot® is data synchronization, which refers to the communication of data at regular intervals. That is, the sender and receiver exchange data to keep their local copies of information up to date with each other. Thus, in an example application, a master copy of a calendar is maintained on a server or a PC, for example, and during synchronization, a copy of the calendar and the master copy on the server or PC are reconciled with more recent updates. Typically, when synchronizing a Palm Pilot® or like PDA device, a connection is made to the user's PC, for example, via a cradle interface device, or by connecting a cable to the PC or from the PC to the Web Server, and, the user waits until the data transfer operation (synchronization) is finished. The synchronization may take a long time depending on the amount of data to be transmitted. During this time the user has to wait close to the PC until the synchronization is finished which may be burdensome to the user for large data transfers. More recent devices such as 3Com's Palm VII™ has the ability to access wireless information, but has a drawback in that one cannot push data to the device. Any data to be received by the Palm VII™ is physically initiated by the user via the same communications channel that the requested data is to be received.

It would thus be additionally highly desirable to provide a wearable electronic device/appliance (a wrist watch) capable of wirelessly accessing data/information over a paging network or RF communications channel in response to a request for the data/information via another medium, such as a telephone or other device, in a manner that obviates the need for user interaction during the synchronization process.

This is to be differed from the well-known "push" data transfer model where "data" is pushed to the user at regular times regardless of the user's present needs, which leads to wasted resources—by storage and communication. Moreover, the user tends to ignore most of the pushed data because there is too much of it or it is stale or not relevant. Likewise, in the pull model the user has to wait for the data to be received and during this time the communication channel is being used, i.e., the data delivery model is synchronous.

SUMMARY OF THE INVENTION

It is an object of the present invention to provide a wearable device/appliance (a wrist watch) capable of wirelessly accessing information and equipped with an interactive user interface and high resolution display for providing a variety of desktop PC-like functions.

It is a further object of the present invention to provide a wearable device/appliance (a wrist watch) capable of wirelessly accessing data/information over a paging network or RF communications channel in response to a request for the data/information initiated via a telephone or other communications device, in a manner which is more convenient to the user and reduces waste of valuable resources.

According to the principles of the invention, there is provided a system and method for enabling a user to asynchronously request (demand) a data transfer operation (pull) via a communication media or channel, and enable synchronous receipt of the requested data over a wireless communication channel for presentation and/or storage in a wearable device/appliance (a wrist watch). The wearable device/appliance includes a wireless data receiver device for receiving the wireless data communication. The system and method preferably comprises: a first communications sub-system enabling a user to initiate a request for data to be communicated to the wearable appliance; a second communications sub-system including a wireless data transmission channel for communicating data to the wearable appliance; and, a server control device for receiving the data requests via the first communications sub-system and, in response to the request, retrieving the requested data for the user and assembling the retrieved data in a form suitable for communication via the second communications sub-system, whereby a user demands the data transfer from the first communications sub-system and receives a data transmission via the second communications sub-system without requiring further user participation during the transmission.

Advantageously, the asynchronous "demand pull" model of the invention is more convenient to the user and reduces waste of resources such as wireless network bandwidth and storage on small devices.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
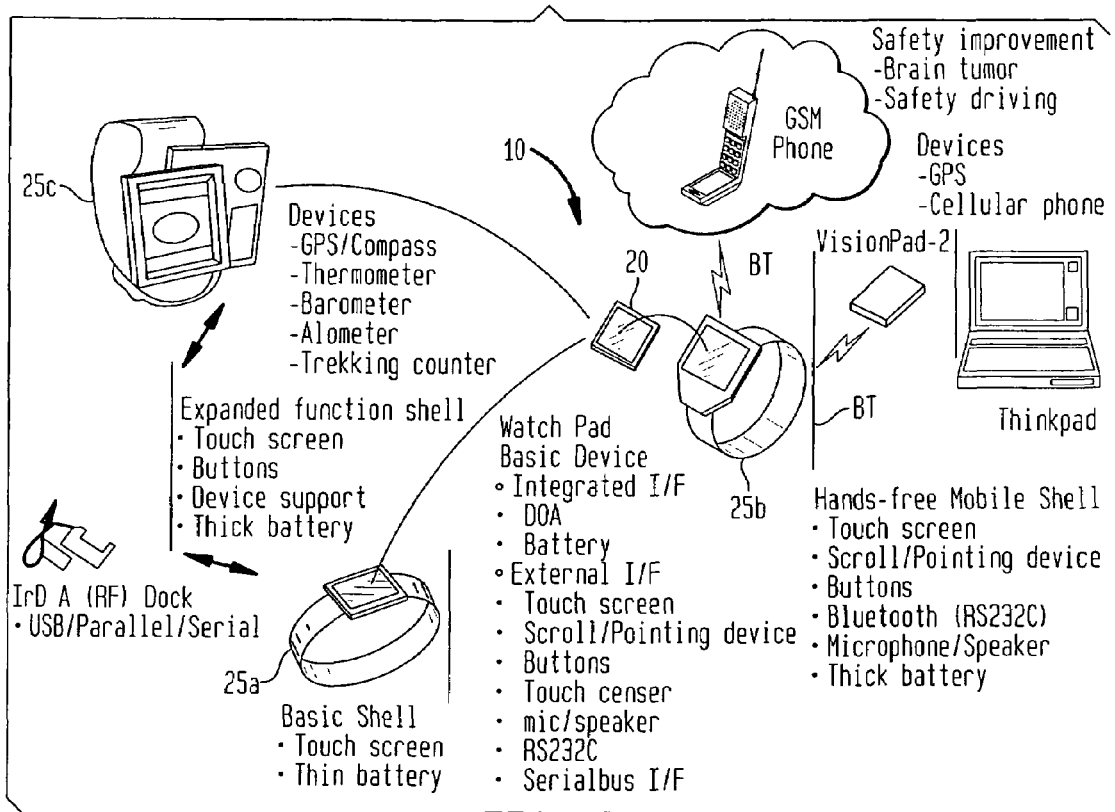
FIG. 1 illustrates conceptually the wearable information access wrist watch device of the invention.

FIG. 1 illustrates conceptually the wearable information access wrist watch device of the invention. Referred to herein as the "Wrist Watch" 10, the system looks like a regular watch but is capable of receiving information from adjunct devices such as a PC, a mobile computer, other pervasive devices being carried by the user and directly from a network via a wireless communications mechanism.

As shown in FIG. 1, the Wrist Watch device 10 is based on a modular concept designed to include a motherboard or base card 20 of minimum card size that leverages state-of-the-art technologies as will be described in greater detail herein. Specifically, the base card 20 may be implemented in various types of shells 25a, . . . , 25c for enabling various functions. For example, the base card 20 may be implemented in a basic shell 25a providing desk-top like functionality via a touch screen display; a hands-free mobile shell 25b providing, in addition to basic desktop functionality, a communications interface with GPS and mobile phone communications capability etc., and including a touch screen display, scroll/pointing devices, and microphone and speaker devices; and an expanded function shell 25c, providing touch screen, buttons and support for various devices such as GPS/compass, thermometer, barometer, altimeter, etc.

Figure 2:
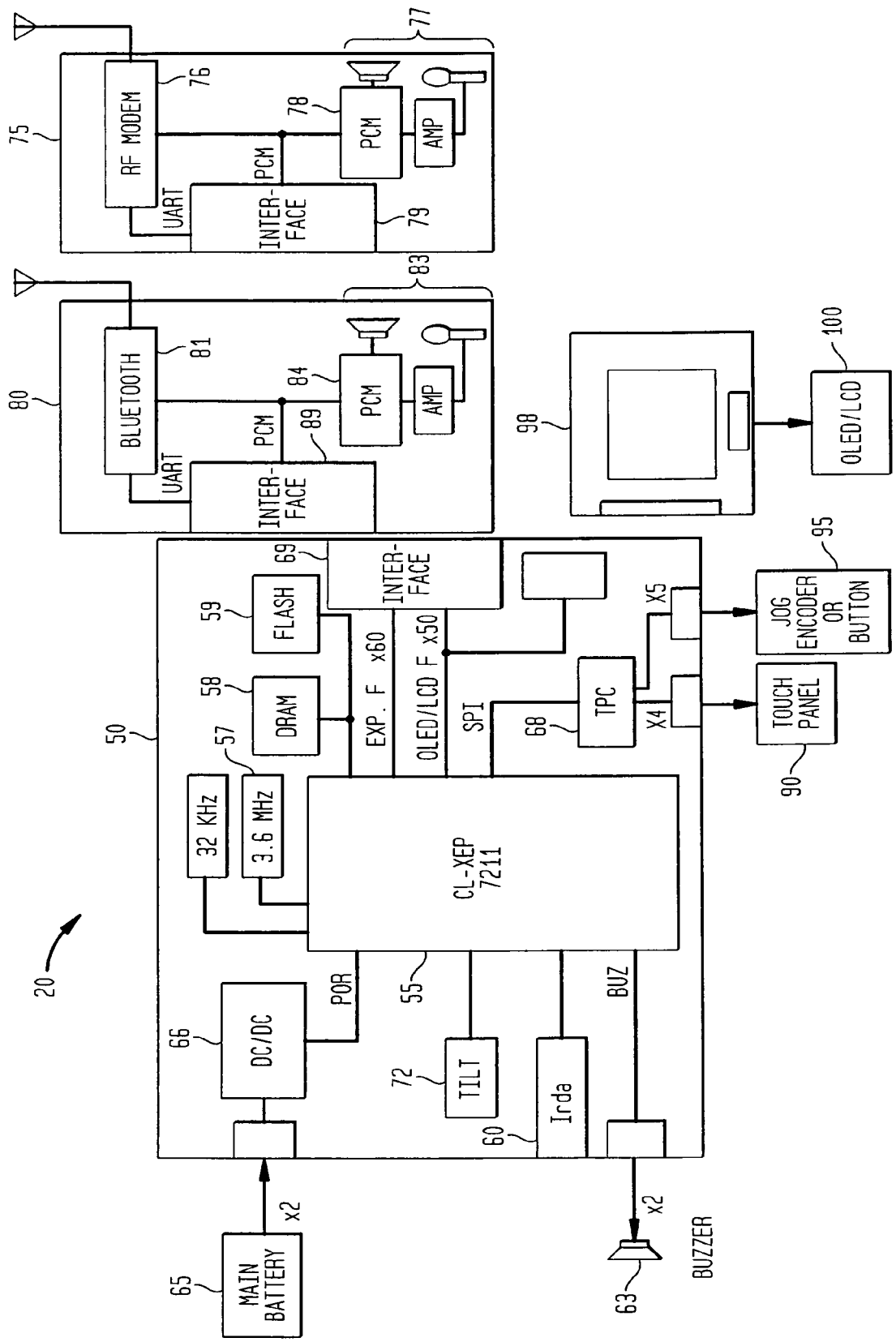
FIG. 2 is a detailed block diagram illustrating the hardware architecture of the Wrist Watch device 10 implementing the dynamic scroll device of the present invention.

FIG. 2 is a detailed block diagram illustrating the hardware architecture of the WatchPad device 10. As shown in FIG. 2, the base card 20 includes a first or main card 50 housing the core processing unit, I/O, and memory. For example the main card 50 includes a CPU 55, such as a Cirrus Logic CL-EP7211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem of the Wrist Watch 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Wrist Watch 10. Other interfaces such as Universal Serial Bus (USB), and I2C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Wrist Watch system/sub-system load.

With further reference to FIG. 2, the main card 50 has no audio capability but is equipped with a PCM audio interface in expansion tabs (not shown) for an accessory card, i.e., either card 75 or 80, in the expanded-shell Wrist Watch designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc.

As shown in FIG. 2, each speaker/microphone combination 77, 83 is connected to a respective pulse-coded modulation PCM coder/encoder devices (CODECs) 78, 84 which are controlled by a respective PCM interface 79,89 to the CPU 55. The accessory card 75, 80 is additionally equipped with various communications subsystems including low power and intermediary power radio frequency communications devices that support a Wireless Application Protocol ("WAP") used to provide communications links to mobile computers, mobile phones, portable handheld devices and, connectivity to the Internet. In one embodiment, the specific communications subsystems include circuitry for supporting BlueTooth 81 or like small-factor, low-cost radio solution circuitry, e.g., an RF-modem 76, and may include other low power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 preferably employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Wrist Watch system 10 is provided with a touch sensitive screen/panel 90 shaped within a standard watch form factor, and also a roller wheel mechanism, i.e., jog encoder 95. The touch sensitive screen enables the direct launching of applications by physical user entry of a graffiti "squiggle" in the manner such as described in commonly-owned co-pending U.S. patent application Ser. No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Wrist Watch display areas. In one embodiment, the touch sensitive screen panel is provided with a four (4) position touch screen. For instance, forward and back navigation for Wrist Watch displays is enabled by physically touching certain areas of the touch sensitive panel. The roller wheel mechanism 95 may be rolled up or down (i.e., clockwise or anticlockwise) to simulate a display cursor scrolling function for text and graphics, and specifically generates signals that are A/D converted for receipt by the processor to enable movement of the Wrist Watch display cursor, and more particularly, movement of an arrow cursor or other displayed indicators providing appointment update and browsing functions. Preferably, when the wheel mechanism moves by more than a predetermined amount, e.g., 20E degrees, the wheel generates a signal as a mouse device would when rolled. If a user rolls the wheel continuously, the wheel generates a signal for every 20 degrees of rotation (hereinafter "rotation event (s)"), with the event generated including an indication specifying whether the wheel was turned clockwise or anticlockwise. In this manner, the direction of the roller wheel, and consequently, the direction of cursor movement through a particular display, is tracked by the processor. The roller wheel mechanism additionally may be pushed or depressed to generate a signal (hereinafter "wheel click event(s)"), akin to a keypress or mouse click event, for activating a selected application, hyperlink or a menu item. In one embodiment, the roller wheel device may comprise a bezel which may be rotated and depressed for generating both rotation and wheel click events in the manner such as described in commonly-owned co-pending U.S. patent application Ser. No. 09/607, 594 entitled BEZEL BASED INPUT MECHANISM AND USER INTERFACE FOR A SMART WATCH, the whole contents and disclosure of which is incorporated by reference as if fully set forth herein. It is understood that other types of scroll device may be implemented to provide cursor movement, e.g., a slider. Moreover, a standard button may be implemented for providing selection functions.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the watch, a mechanical four-way tilt sensor 72 is further provided comprising mechanical switches (for detecting degree of tilt) producing signals which may be detected by the CPU. This sensor may be used for the various purposes such as power management, display control, etc. In a preferred embodiment, additional sensors may be attached to the Wrist Watch device over an interface. Examples may include additional tilt and motion (velocity, direction, speed) sensors, environment sensors such as thermal sensors, pressure sensors, health monitoring sensors such as blood pressure, etc. The Wrist Watch accordingly provides the display for the sensor and may also analyze the data collected from the sensors.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items on the watch face, similar to what may be displayed on a computer screen or a Palm Pilot®. For example, the time may be represented by drawing the hour and minute hands on a watchface display. Further, the hands of the watchface display may be erased when, at some other time, a display of a photograph is desired to be displayed.

Figure 3:
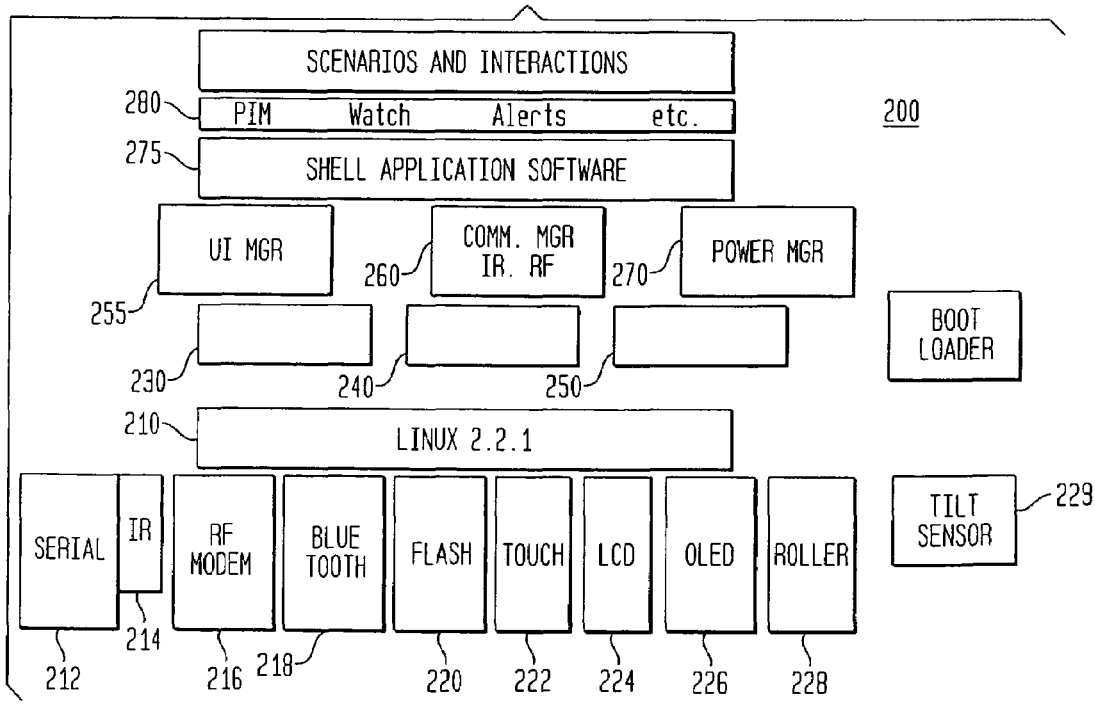
FIG. 3 illustrates the software architecture 200 for the Wrist Watch device 10.

FIG. 3 illustrates the software architecture 200 for the Wrist Watch device 10. At its lowest level, the Wrist Watch system runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver 226, roller wheel subsystem driver 228 and tilt sensor device driver 229. A client-server graphics subsystem 230, storage subsystem manager 240 and synchronization sub-system manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the roller wheel, bezel (i.e., jog encoder) and touch panel for the appropriate applications. A communication subsystem manager 260 is provided to handle events from communication channels and pass the events to the right application to set things up for data transfers to proceed. In accordance with the principles of the invention, the synchronization manager 250 is provided to synchronize data transfer between the Wrist Watch device and the other devices. Particularly, it receives the data from the communication channel and operates in conjunction with the right application to decode the sent data and update the data for the application receiving the data. An example of this would be an update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

Figure 4:
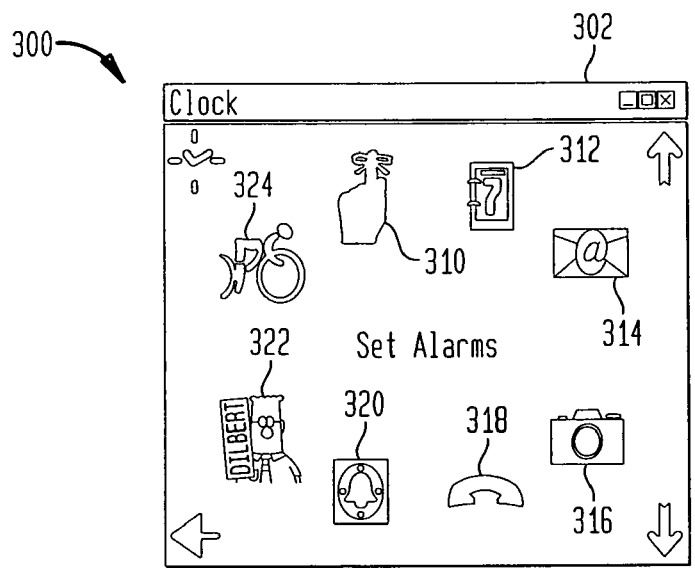
FIGS. 4 and 5 illustrate example system displays 300 and 400 providing respective menu ring of selectable icons for launching Personal Information Management applications provided in the Wrist Watch device.
Figure 5:
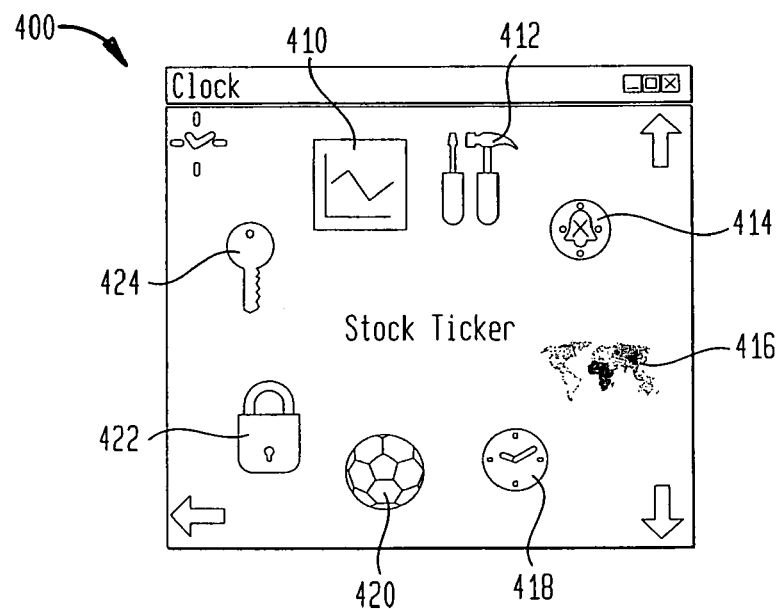

As further shown in FIG. 3, the Wrist Watch device 10 is equipped with Wrist Watch shell application software 275 provided on top of the basic graphics, communication and synchronization subsystems. One key application supported is the microbrowser which enables access to a WAP-supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms. Other supported applications include Personal Information Management (PIM) applications software 280. FIG. 4 illustrates an example system display 300 providing a main menu 302 comprising selectable icons for launching the following PIM applications: an icon 310 for launching an application directed to displaying/maintaining "to do" lists, an icon 312 for launching an application directed to displaying/maintaining calendars and appointments, an icon 314 for launching an application directed to retrieving/storing/displaying e-mail messages, an icon 316 for launching an application directed to retrieving/storing/displaying digital photographs and bit-mapped images, an icon 318 for launching an application directed to retrieving/storing/displaying phone lists, an icon 320 for launching an application directed to setting of time and alarms which is shown highlighted, an icon 322 for launching an application directed to retrieving/storing/displaying comic images such as Dilbert© United Feature Syndicate, Inc., and, an icon 324 for launching an application directed to providing stop watch and elapsed time features. FIG. 5 illustrates a second example system display 400 providing a main menu 402 comprising a menu ring of selectable icons for launching other PIM applications including: an icon 410 for launching an application directed to retrieving stock quotes from the world wide web and displaying/maintaining a stock ticker shown highlighted in the display, an icon 412 for launching an application directed to retrieving/storing/displaying Wrist Watch display tools, an icon 414 for launching an application directed to retrieving/storing/displaying set various alarms, an icon 416 for launching an application directed to retrieving/storing/displaying world time zone information, an icon 418 for launching an application directed to setting of the watchface clock, an icon 420 for launching an application directed to retrieving/storing/displaying games, an icon 422 for launching an application directed to providing security features, and, an icon 424 for launching an application directed to storing and displaying user passwords, key locations, and other sensitive data and subject matter that needs to be remembered. Inter-device interaction software applications are included to permit the watch display to become the display for another device such as a GPS located in a concealed location, (e.g., a bag), or a thermostat on the wall, etc. Thus, this application software enables communication between the other device and the Wrist Watch by receiving/displaying the data and transmitting back information sent from the Wrist Watch. As a further example, caller Id information may be displayed on the Wrist Watch display when the cell phone that belongs to that person rings. Typically, multiple persons are congregated in a room and carry their cell phones in a hand bag or wear them on their belts, have a hard time determining which cell phone is ringing when a ringing tone is heard in a room. This results in every person in the room pulling out his/her cell phone out of their handbag or belt to check if it is the one that is ringing. The caller Id display feature of the Wrist Watch device is particularly advantageous as each wearer may simply glance at the watch and would immediately know if the ringing phone belonged to him/her, in addition, to determining who the calling party is facilitating the decision of whether or not he/she should answer the phone.

In a further example, this application software may allow the data from the Wrist Watch storage subsystem 240 to be viewed on another device such as on a PDA, PC, and other community viewing devices. In the preferred embodiment, middleware such as Tcl/Tk, Javascript, Perl, or the like etc., may run on top of the operating system, graphics and communication manager APIs for facilitating rapid development of these applications on the Wrist Watch device 10.

The present invention is directed to the capability of enabling a user to request a synchronization operation by using a first communication medium, e.g., a telephone or other device, to initiate data request and, then synchronize in time with the user so that the Wrist Watch device may later receive the requested data, preferably, wirelessly over a second communication medium, e.g., via a pager network or an RF communications channel.

Figure 6:
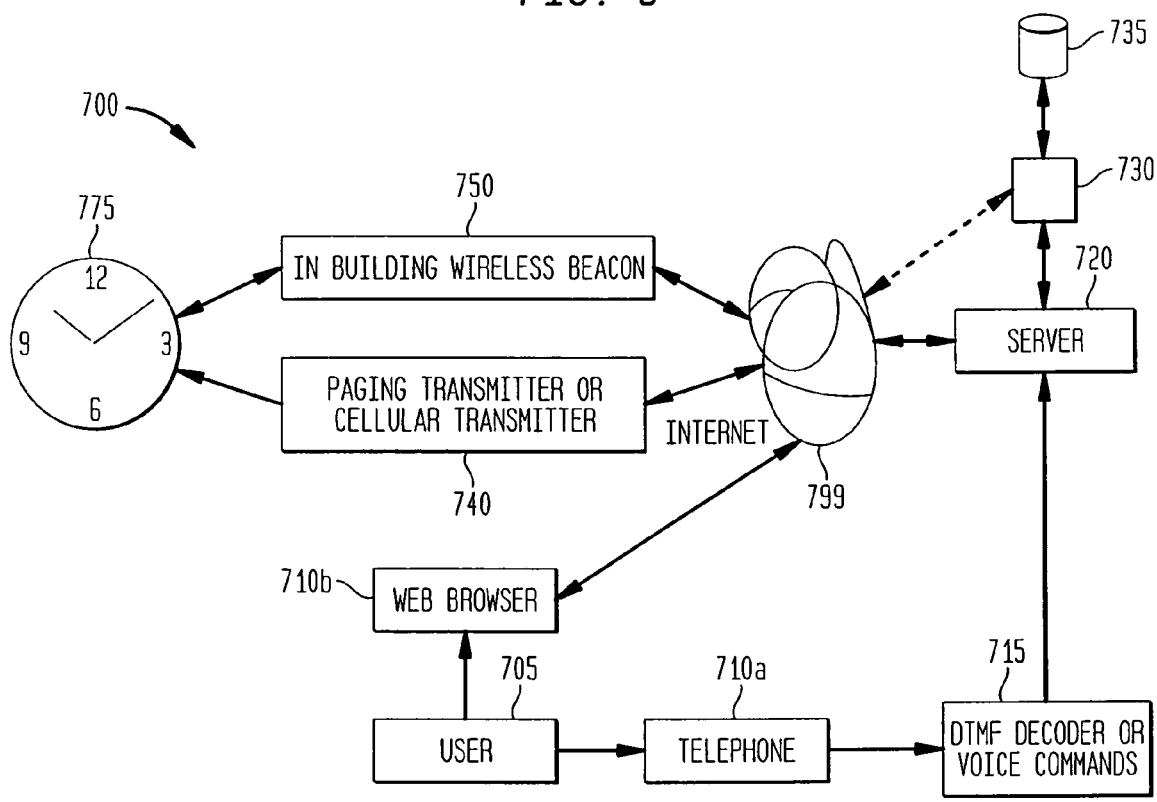
FIG. 6 is a block diagram illustrating the system for enabling a user to asynchronously request a data transfer operation (pull) via a first communication medium or channel, and enable synchronous receipt of the requested data over a wireless communication channel for storage/presentation in the Wrist Watch device.
Figure 7A:
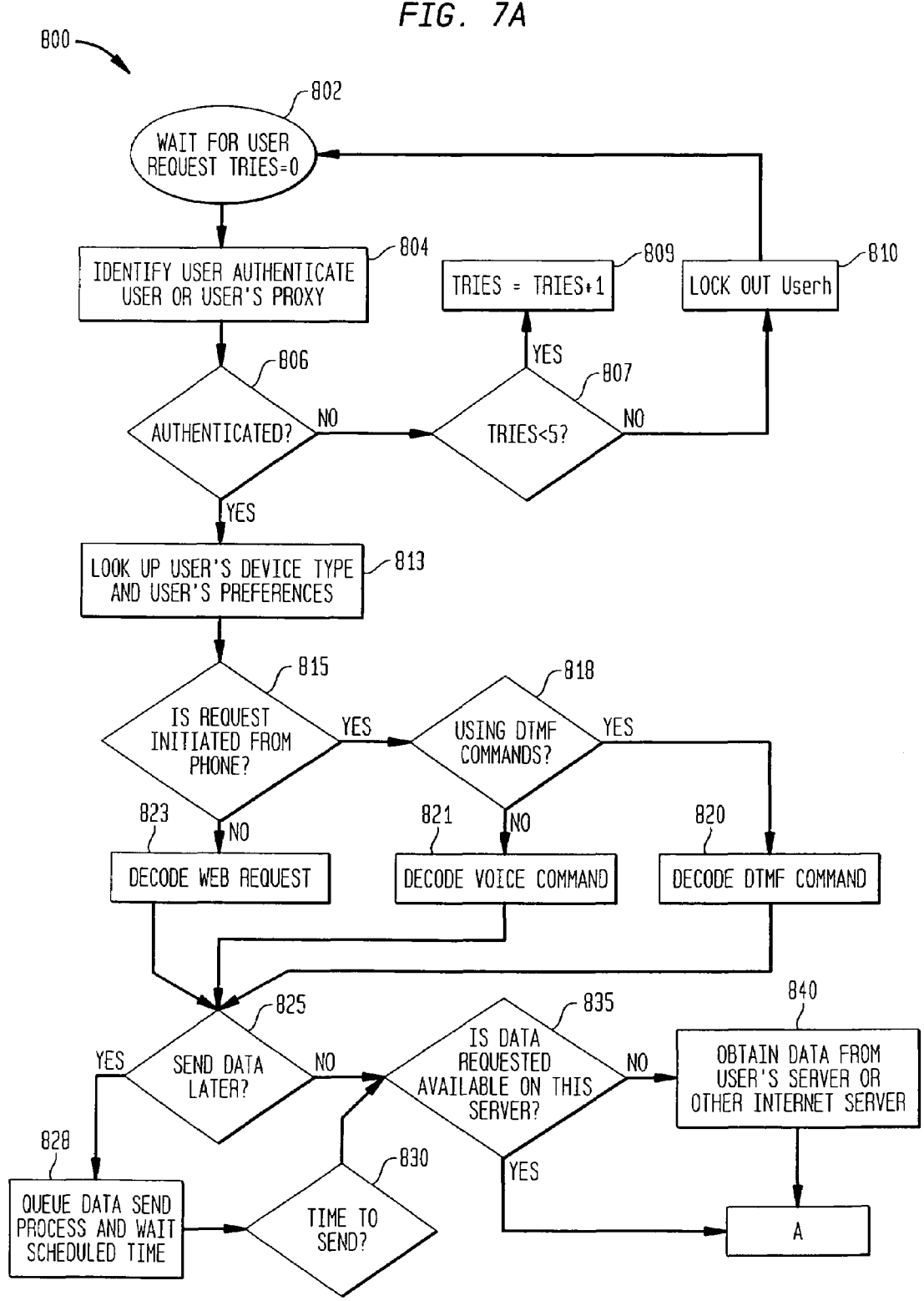
FIGS. 7(a) and 7(b) comprise a block diagram illustrating the method 800 implemented by the central server device implemented for asynchronously data pull.
Figure 7B:
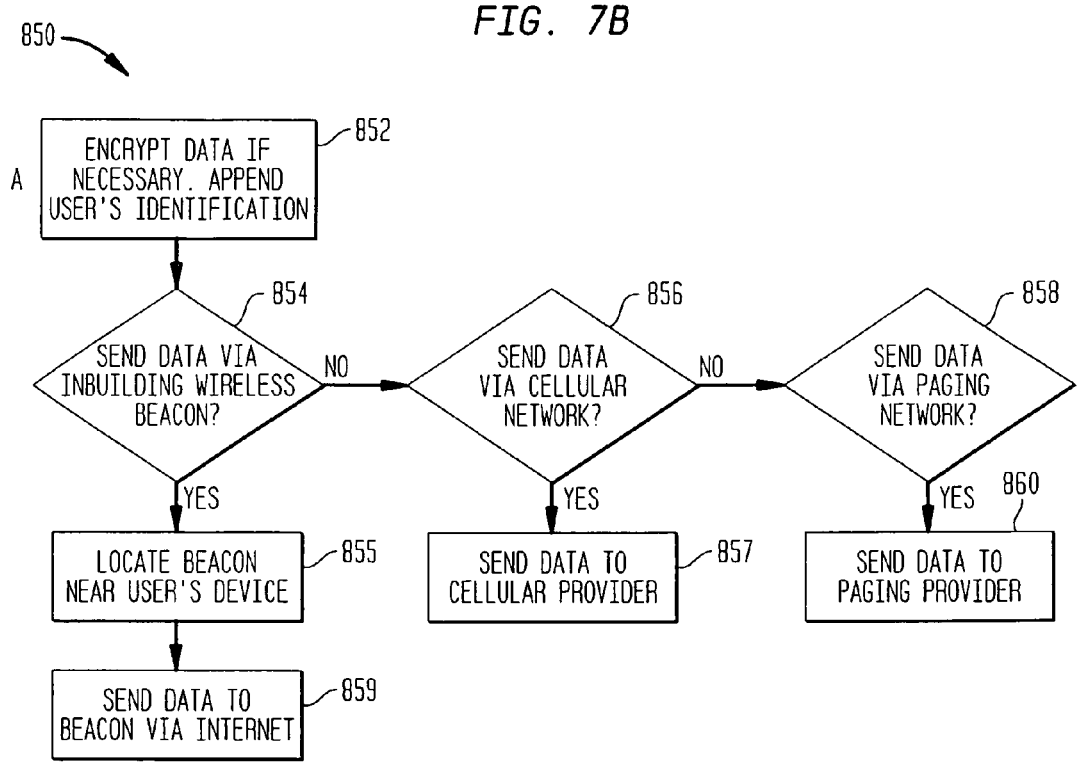

FIG. 6 is a block diagram illustrating the system 500 for enabling a user to asynchronously request a data transfer operation (pull) via a first communication medium or channel, and enable receipt of the requested data over a second wireless communication channel for storage in the Wrist Watch device. FIGS. 7(a) and 7(b) comprise a block diagram illustrating the method 800 implemented by a central server device employed in the process.

As shown in FIG. 6, a first step 705 requires a user to first initiate a request to a central server 720 via a communication media such as a telephone media 710a, for example, by dialing a toll-free telephone number, or via the Internet 799 as initiated by a web browser 710b. The user or caller will be prompted to enter and transmit a password or such unique identification code, e.g., by voice or by other telephone keypad entry, if by the telephone, or by keyboard entry via a web browser interface. It is understood that the web browser device through which the user interacts may include any device, including, but not limited to: a Web TV, a screen phone, a terminal attached to a set top box, a kiosk at an airport, etc. If the communication is initiated by telephone, then as shown in FIG. 7, the password identifier is communicated as dual-tone multi frequency (DTMF) signals which are decoded by a DTMF decoder device 715 and communicated to the central server 720. Alternately, voice signals may be decoded for communication to the server. In an alternate embodiment, the central server 720 may employ the DTMF decode and voice recognition devices for decoding the received user requests.

In the method 800 depicted in FIG. 7(a), at step 802, the central server is programmed to receive user request messages and initializes a flag for tracking the number of entry attempts for a particular call. At step 804, the caller's identity is determined and steps are taken to authenticate the caller, which may be the Wrist Watch owner or that user's authorized proxy. At step 806, a determination is made as to whether the caller has been authenticated. If the caller has not been authenticated, and less than a predetermined amount of attempts have been made, e.g., five attempts, as determined at step 807, then the tracking flag is incremented by one at step 809 and an attempt is again made to authenticate the caller. These steps 804-809 are repeated until the user is authenticated; otherwise, at step 810, the caller is locked out and disconnected from the current session.

In response to user identification and authentication steps, as shown in FIG. 7(*a*), at step 813, software executing on central server device 720 determines the user's Wrist Watch device type and set of preferences/personalized menu options that he/she may have previously set up and presents these to the user for his selection in accordance with the particular communications media. For instance, a first menu option that a user may select may be to forward messages from a manager or supervisor; a second selectable menu option may be to forward messages from a day care center; a third selectable menu option may be to forward all calendar information or all changes to that user's calendar/appointment book since a predetermined time, e.g., the morning of the current day. As another example, the user may select an option specifying receipt of all new e-mail headers since the last time the user retrieved his/her e-mail from a mail server, or, receipt of the last 50 phone numbers from the user's address book, or receipt of the user's preferred list of stock quotes, etc. One skilled in the art may determine the necessary options for any given application. As an alternate to the personalized menu choices, the server software may present a menu of generic user selections. Furthermore, it should be understood that the user may comprise the actual user or an authorized agent of the user, e.g., the user's administrative assistant, spouse, children, etc., or other people who have access authority. The data access mechanisms employed by the central server 720 will recognize the data access rights for authorized users. Thus, for example, a user's administrative assistant may be able to page a user's work calendar, but not that users stock quotes, for example. For user selection, the user simply enters the choice via the particular communication media that user is interacting with. Thus, at step 815, a determination is made as to whether the phone request and menu selection was initiated by telephone media 710*a*, and if so, further determines at step 818 whether and DTMF commands were received. If DTMF commands were received, then they are decoded at step 820, otherwise, at step 821 received voice commands are decoded. If at step 815, it is determined that the request was not initiated by a telephone, then the server will decode the entered password and menu choices via a Web based communication as indicated at step 823. It is understood that the password and menu selection entry via the web browser interface may be initiated by keyboard entry, and/or by selecting certain icons or buttons, or links. It is understood that these actions may be performed quickly and the user may immediately hang up the phone (710*a*) or log out of the web browser device (710*b*) as soon as the user has specified the data he/she needs to retrieve.

Figure 8:
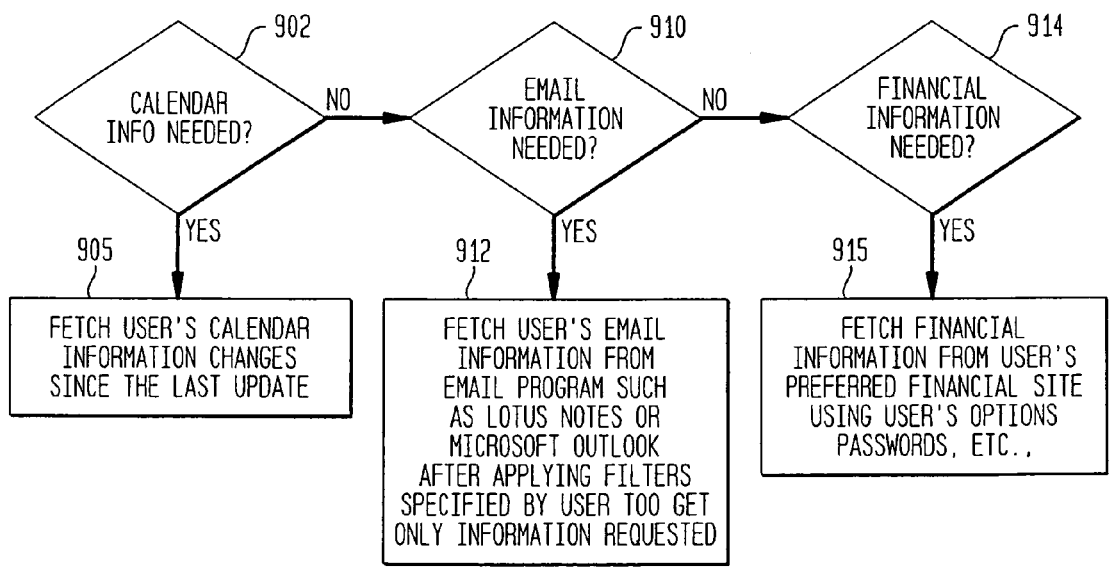
FIG. 8 illustrates an example decision thread 900 executed by the server for retrieving the user requested data.

In any event, as indicated at step 825, the central server makes a determination as to whether the entered user command indicates that the data is to be immediately sent or is to be synchronized for later delivery in accordance with a user specified time. If the requested data is to be sent later, then a process is invoked in the server to initialize queuing of data, e.g., in a buffer storage area (not shown) until the specified time as indicated at step 828. Whether the request is for immediate transmission to the user at step 825, or, at such time the data is required to be sent as indicated at step 830, a determination is made at step 835 as to whether the requested data is available on the central server. If the data is not available on the server device, then it is obtained for the user's server or another Internet server as indicated at step 840. Thus, returning to FIG. 6, it is assumed that the server device 720 may be directly networked with, or, at a minimum, has direct access to, the user's PC or machine 730, web page, or database 735 (e.g., Lotus Notes database) where the user's data resides and possesses all of the necessary authorizations that may be needed for server 730 and data base 735 so that it may obtain the data. Alternately, via a user's server device 730, the retrieved requested data may be communicated via the Internet 799 back to the server 720. FIG. 8 illustrates the decision thread 900 implemented by the server for ascertaining the type of requested data to be retrieved. For instance, in accordance with the above-described example menu choices, at a step 902 it is determined whether user's calendar/appointment information was requested in which case, at step 905, calendar information and updates will be retrieved. Alternately, e-mail information may have been requested at step 910 in which case that information is retrieved at step 912. Likewise, if financial information is requested at step 914, this information will be fetched and received in accordance with user's settings and options.

In one aspect of the invention, the server initiates transmission of the requested data to the user via a wireless communications device such as a pager, an RF communications radio, a Mobitex network, or a cellular phone network. This data may be received by the user's wrist watch via a wireless communications channel such as provided by a beacon 750 or paging network 740 with the data communicated by a respective wireless beacon or paging transmitter. In one embodiment, the wireless beacon or paging transmitter may receive the data to be transmitted directly from central server 720 or alternately, from the user's PC or machine via a network or the Internet. Preferably, the data is transmitted in a timely fashion according to the user's availability, with the advantage that the user may proceed with other work instead of being tied to the telephone or the web access device.

Thus, returning back to FIG. 7(*a*), after retrieving the requested data from the central server at step 835, or, from the user's server via the Internet at step 840, a processing thread 850 is executed for initiating the transmission of the data requested by the user in synchronism with user availability such as depicted in FIG. 7(*b*). As shown in a first step 852, the data is optionally encrypted and appended to the user's device identification. Then a decision is made at step 854 to determine whether the data is to be sent via the in building wireless beacon. If the data is to be sent by wireless beacon, then the software executing in the central server determines the beacon closest to the Wrist Watch device receiver at step 855 and automatically transmits the data to that located beacon via the Internet at step 859. If the data is not to be sent by in building wireless beacon, then at step 856 a determination is made as to whether the data is to be sent via a cellular network, in which case the data is provided to the cellular provider at step 857. If the data is not to be sent by in building wireless beacon or cellular network, then at step 858 data is to be sent via a paging network with the requested data sent to the paging provider at step 860.

Referring back to FIG. 6, it is understood that the transmitted data may received over multiple channels by the user's wireless receiver circuit provided in the Wrist Watch device 775, e.g., via the BlueTooth receiver (FIG. 2), RF-modem, or pager circuits such as flex pager, Bell Mobitex, etc. If the user has a pager, then the paging network directly sends the signal directly to the user's wrist watch device, e.g., directly from a paging terminal tower/transmitter 740. Alternately, the signal may be directly transmitted to the user via a cellular phone transmitter. Thus, for example, if the Wrist Watch device is not equipped with a pager, then the server will transmit the data to a beacon, e.g., BlueTooth beacon, which receives the data on the user's behalf and subsequently transmits the data back to the user's wrist watch device via the Wrist Watch device communications receiver card (FIG. 2). As known to skilled artisans, a set of protocols for locating a user's device in a wireless network may be implemented and various handshake mechanisms invoked for handing off the data from one beacon to the next, and so on, for eventual receipt by the Wrist Watch device. Furthermore, the data to be transmitted is suitably processed for transmission according to the communications protocol, e.g., assembling the requested data into suitable packets for efficient use by the packet networks. Once the device is out of range from the beacon, the beacon indicates to the central server that the device is out of range and additionally indicates the last piece of data that was successfully transferred to the device. The server 720 then waits until another beacon notifies it that the user's Wrist Watch device is in range and then continues the transmission of the data.

As an embellishment to the foregoing, the user may specify a future time and location where to send the requested data. Thus, if the user knows that he/she will be at a certain place at a certain time, he/she may request that data be sent at that future time. The system will automatically route the information to the user at that requested time. Furthermore, the Wrist Watch device may be simultaneously programmed to awake or transit to a data communications receive mode, so that the requested data at the future time may be received. Thus, the user may initiate (demand) a data transfer for a future time, e.g., 6:00 P.M. and place his Wrist Watch device in a sleep mode with an alarm set for activation at the scheduled time. The Wrist Watch device may alternately be programmed to automatically awake a few minutes before the scheduled transfer time. Setting of a scheduled alarm time may be set in accordance with the principles of the invention described in commonly-owned, co-pending U.S. patent application Ser. No. 09/608,043 entitled ALARM INTERFACE FOR SMART WATCH, the whole contents and disclosure of which is incorporated by reference as if fully set forth herein.

As described herein with respect to FIG. 2, it is understood that the requested data, once received, may be temporary stored in the memory devices provided in the card, and/or may immediately displayed via the high-resolution display in accordance with a desired PIM application.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A system for communicating data to a wrist watch device including a wireless data receiver device for receiving wireless data communications, said system comprising:

a first communications sub-system enabling a user to initiate an asynchronous request for data to be communicated to said wrist watch device, said request including a user-specified future time and location information;

a server control device for receiving said data request via said first communications sub-system and, in response to said request, retrieving said requested data for said user and assembling said retrieved data in a suitable form, and for transmitting said data in said suitable form to a second communications sub-system, said second communications sub-system including a wireless data transmission channel for transmitting in turn said data in said suitable form to said wrist watch at a specified future time and location determined according to the time and location information included in said request, said second communications system for said wireless data transmission including in-building beacons, said wrist watch device including an alarm mechanism for placing said wireless data receiver device in a receive mode of operation for receiving said wireless data communications in synchronism with user availability at said user-specified future time and location without requiring further user participation during said transmission, said server control device determining a wireless beacon closest to said wireless data receiver prior to communicating said wireless data communications, and, further determining if said wireless data receiver is out of range from the beacon; and, if said server control device determines that said wireless data receiver is out of range from the beacon, said beacon communicating a last piece of data that was successfully transferred to the wrist watch device to the server control device, said server control device waiting until another beacon notifies the server device that the wireless data receiver is in range and, in response, said server control device continues the transmission of data;

wherein said user request further includes a user identification code for uniquely identifying the user's wrist watch device and ensuring proper data transmission thereto, said server control device further including a mechanism for generating a personalized menu comprising user selections of types of data to be transmitted based on said user identification code.

2. The system as claimed in claim 1, wherein said first communications sub-system comprises a telephone system including a telephone keypad, said user identification code comprising a sequence of one or more dual-tone multi-frequency DTMF signals entered by said user via said telephone keypad.

3. The system as claimed in claim 2, wherein said server control device includes mechanism responsive to said user identification code for retrieving said personalized menu of types of data to be transmitted and generates a voice transmission for presenting said personalized menu selections to said user via said telephone system.

4. The system as claimed in claim 3, wherein said user selects a type of data to be transmitted via said telephone keypad, said server control device includes mechanism for receiving DTMF signals and interpreting said DTMF signals for association with said user menu selection.

5. The system as claimed in claim 1, wherein said first communications sub-system comprises a personal computing device implementing a Web browser for accessing and communicating with said server control device via Web-based communications, wherein said user identification code comprises entry of a password entry via a keyboard device entered in a Web page.

6. The system as claimed in claim 5, wherein said server control device includes mechanism responsive to said user identification code for retrieving said personalized menu of types of data to be transmitted and generates a Web-based communication for receipt by said user Web browser to present said personalized menu.

7. The system as claimed in claim 6, wherein said user selects a type of data to be transmitted via a mouse device by clicking a menu choice presented on a Web page.

8. The system as claimed in claim 1, wherein said second communications sub-system comprises a paging network.

9. The system as claimed in claim 1, wherein said second communications sub-system comprises a BlueTooth wireless communications network.

10. The system as claimed in claim 1, her comprising:
means for providing pre-determined personalized selectable menu option choices to a user for user selection at a time of making a data request, said pre-determined personalized selectable menu option choices relating to requests for receipt of data associated with two or more user applications each adapted for execution on said wrist watch device, and which data is received and maintained for users as part of said associated user applications, wherein said menu options enable a user to set specific data delivery options in advance or at data request time, to specify what data needs to be sent and the user-specified time.

11. A method for communicating data to a wrist watch device implementing a wireless data receiver device for receiving wireless data communications,
 a) receiving, via a first communications sub-system, an asynchronous user request for data to be communicated to said wrist watch device, said request indicating a user-specified future time and location for said requested data;
 b) retrieving, in response to said user request from said first communication system, said requested data for said user and assembling said retrieved data in a suitable form;
 c) transmitting said data in said suitable form over a data wireless communications channel via a second communications sub-system at a future time and location specified according to the time and location information included in the request, said second communications sub-system for said wireless data transmission including in-building beacons; and,
 d) placing said wireless data receiver device of said wrist watch in a receive mode of operation for receiving said wireless data communications in synchronism with user availability at said user-specified future time and location without requiring further user participation during said transmission,
 determining, by a server control device, a wireless beacon closest to said wireless data receiver and transmitting said data to said wireless data receiver via said beacon, and,
 determining if said wireless data receiver is out of range from the beacon; and, if it is determined that said wireless data receiver is out of range from the beacon, said beacon communicating a last piece of data that was successfully transferred to the wrist watch device to the server control device, and,
 waiting at said server control device until another beacon notifies the server device that the wireless data receiver is in range, and,
 in response, said server control device continues transmitting said data to said wireless data receiver via said another beacon;
 wherein said data request includes a user identification code for uniquely identifying the user's wrist watch device and ensuring proper data transmission thereto, wherein prior to said retrieving step b), the step of presenting a personalized menu to said user, said menu comprising user selections associated with types of data to be transmitted based on said user identification code.

12. The method as claimed in claim 11, wherein said first communications sub-system comprises a telephone system including a telephone keypad, said user identification code comprising a sequence of one or more dual-tone multi-frequency DTMF signals entered by said user via said telephone keypad.

13. The method as claimed in claim 12, wherein said presenting step further includes the steps of:
 retrieving said personalized menu of types of data to be transmitted from a storage device; and,
 generating a voice transmission for presenting said personalized menu selections to said user via said telephone system in response to said user identification code.

14. The method as claimed in claim 13, wherein said retrieving step b) further includes the steps of receiving DTMF signals associated with said user menu selection and interpreting said received DTMF signals for retrieving said requested data.

15. The method as claimed in claim 11, wherein said first communications sub-system comprises a personal computing device implementing a Web browser for accessing and communicating with said server control device via Web-based communications, said user identification code comprising a password entry via a keyboard device entered in a Web page.

16. The method as claimed in claim 15, wherein said presenting step further includes the steps of:
 retrieving said personalized menu of types of data to be transmitted; and,
 generating a Web-based communication for receipt by said user Web browser to present said personalized menu.

17. The method as claimed in claim 16, wherein said retrieving step b) is responsive to a user mouse click on a Web page menu selection of a type of data to be transmitted.

18. The method as claimed in claim 11, further comprising:
 providing predetermined personalized selectable menu option choices to a user for user selection at a time of making a data request, said pre-determined personalized selectable menu option choices relating to requests for receipt of data associated with two or more user applications each adapted for execution on said wrist watch device, and which data is received and maintained for users as part of said associated user applications,
 wherein a user is enabled to set specific data delivery options in advance or at data request time to specify, via said menu options, what data needs to be sent and the user-specified time.

19. A program storage device readable by a machine, tangibly embodying a program of instructions executable by the machine to perform method steps for communicating data to a wrist watch device implementing a wireless data receiver device for receiving wireless data communications, said method steps including the steps of:
 a) receiving, via a first communications sub-system, an asynchronous user request for data to be communicated to said wrist watch device, said request indicating a user-specified future time and location for said requested data;
 b) retrieving, in response to said user request from said first communication system, said requested data for said user and assembling said retrieved data in a suitable form;
 c) transmitting said data in said suitable form over a data wireless communications channel via a second communications sub-system at a future time and location specified according to the time and location information included in the request, said second communications sub-system for said wireless data transmission including in-building beacons; and, d) placing said wireless data receiver device of said wrist watch in a receive mode of operation for receiving said wireless data communications in synchronism with user availability at said user-specified future time and location without requiring further user participation during said transmission, determining, by a server control device, a wireless beacon closest to said wireless data receiver and transmitting said data to said wireless data receiver via said beacon, and, determining if said wireless data receiver is out of range from the beacon; and, if it is determined that said wireless data receiver is out of range from the beacon, said beacon communicating a last piece of data that was successfully transferred to the wrist watch device to the server control device, and, waiting at said server control device until another beacon notifies the server device that the wireless data receiver is in range, and, in response, said server control device continues transmitting said data to said wireless data receiver via said another beacon;

wherein said data request includes a user identification code for uniquely identifying the user's wrist watch device and ensuring proper data transmission thereto, wherein prior to said retrieving step b), the step of presenting a personalized menu to said user, said menu comprising user selections associated with types of data to be transmitted based on said user identification code.

20. The program storage device readable by a machine as claimed in claim 19, wherein said first communications sub-system comprises a telephone system including a telephone keypad, said user identification code comprising a sequence of one or more dual-tone multi-frequency DTMF signals entered by said user via said telephone keypad.

21. The program storage device readable by a machine as claimed in claim 19, wherein said presenting step further includes the steps of:

retrieving said personalized menu of types of data to be transmitted from a storage device; and, generating a voice transmission for presenting said personalized menu selections to said user via said telephone system in response to said user identification code.

22. The program storage device readable by a machine as claimed in claim 19, wherein said retrieving step b) further includes the steps of receiving DTMF signals associated with said user menu selection and interpreting said received DTMF signals for retrieving said requested data.

23. The program storage device readable by a machine as claimed in claim 19, wherein said first communications sub-system comprises a personal computing device implementing a Web browser for accessing and communicating with said server control device via Web-based communications, said user identification code comprising a password entry via a keyboard device entered in a Web page.

24. The program storage device readable by a machine as claimed in claim 23, wherein said presenting step further includes the steps of:

retrieving said personalized menu of types of data to be transmitted; and, generating a Web-based communication for receipt by said user Web browser to present said personalized menu.

25. The program storage device readable by a machine as claimed in claim 24, wherein said retrieving step b) is responsive to a user mouse click on a Web page menu selection of a type of data to be transmitted.

* * * * *